United States Patent
Park et al.

(10) Patent No.: US 9,972,983 B2
(45) Date of Patent: May 15, 2018

(54) WIRING SYSTEM OF SUNROOF FOR VEHICLE

(71) Applicants: HYUNDAI MOTOR COMPANY, Seoul (KR); WEBASTO DONGHEE HOLDINGS, Ulsan (KR)

(72) Inventors: Hoo Sang Park, Hwaseong-si (KR); Su Yun Choi, Ulsan (KR)

(73) Assignees: HYUNDAI MOTOR COMPANY, Seoul (KR); WEBASTO DONGHEE HOLDINGS, Ulsan (KR)

( * ) Notice: Subject to any disclaimer, the term of this patent is extended or adjusted under 35 U.S.C. 154(b) by 0 days. days.

(21) Appl. No.: 15/391,414

(22) Filed: Dec. 27, 2016

(65) Prior Publication Data
US 2018/0102634 A1    Apr. 12, 2018

(30) Foreign Application Priority Data
Oct. 10, 2016    (KR) .................. 10-2016-0130487

(51) Int. Cl.
| | |
|---|---|
| *B60J 7/043* | (2006.01) |
| *H02G 3/04* | (2006.01) |
| *H02S 10/40* | (2014.01) |
| *H02S 40/34* | (2014.01) |

(52) U.S. Cl.
CPC .......... *H02G 3/0456* (2013.01); *B60J 7/043* (2013.01); *H02G 3/0462* (2013.01); *H02S 10/40* (2014.12); *H02S 40/34* (2014.12); *B60Y 2400/216* (2013.01); *B60Y 2410/115* (2013.01)

(58) Field of Classification Search
CPC .......... B60Y 2410/115; B60Y 2400/16; H02S 40/34

USPC .......................................... 296/211
See application file for complete search history.

(56) References Cited

U.S. PATENT DOCUMENTS

| | | | | |
|---|---|---|---|---|
| 3,056,628 | A * | 10/1962 | Golde ................. | B60J 7/0573 200/61.43 |
| 6,036,259 | A * | 3/2000 | Hertel ................. | B60J 7/0573 174/117 F |
| 6,129,413 | A | 10/2000 | Klein | |
| 6,254,176 | B1 * | 7/2001 | Hare .................... | B60J 7/043 296/211 |

(Continued)

FOREIGN PATENT DOCUMENTS

| | | |
|---|---|---|
| KR | 10-1233770 | 2/2013 |
| KR | 10-1428215 | 8/2014 |

(Continued)

*Primary Examiner* — Dennis H Pedder
(74) *Attorney, Agent, or Firm* — Brinks Gilson & Lione

(57) ABSTRACT

The present disclosure provides a wiring system of a sunroof for a vehicle. The wiring system includes a moving part configured to move to open or close a roof of a vehicle, and a fixed part configured to connect the moving part and a vehicle body. The fixed part further includes a guide rail configured to guide movement of the moving part, a moving thread configured to move along the guide rail in a forward or rearward direction of the vehicle, a lever configured to connect the moving part and the moving thread, and an electrode part configured to electrically connect the moving part and the vehicle body. The electrode part constantly maintains electrical connection between the vehicle body and the moving part while the moving part is moving, and is changed in length corresponding to movement of the moving thread.

8 Claims, 5 Drawing Sheets

(56) References Cited

U.S. PATENT DOCUMENTS

| | | | | |
|---|---|---|---|---|
| 6,517,148 | B1 * | 2/2003 | Teschner | B60J 7/00 296/211 |
| 6,682,353 | B2 * | 1/2004 | Bigotto | B60R 16/027 296/155 |
| 6,997,499 | B2 * | 2/2006 | Tsubaki | B60N 2/0224 174/72 A |
| 7,238,029 | B2 * | 7/2007 | Tsubaki | B60R 16/0215 174/72 A |
| 2014/0028059 | A1 | 1/2014 | Sung et al. | |

FOREIGN PATENT DOCUMENTS

| | | |
|---|---|---|
| KR | 10-2016-0052167 | 5/2016 |
| KR | 10-2016-0114878 | 10/2016 |

* cited by examiner

[ SECTION C-C ]

[ SECTION B-B ]

[ SECTION E-E ]

[ SECTION F-F ]

WIRING SYSTEM OF SUNROOF FOR VEHICLE

CROSS-REFERENCE TO RELATED APPLICATION

This application claims priority to and the benefit of Korean Patent Application No. 10-2016-0130487, filed on Oct. 10, 2016, which is incorporated herein by reference in its entirety.

FIELD

The present disclosure relates to a wiring system of a sunroof for a vehicle, which is capable of constantly maintaining an electrical connection even while a moving part of a sunroof is moving.

BACKGROUND

The statements in this section merely provide background information related to the present disclosure and may not constitute prior art.

Recently, technology has been developed to mount a solar cell panel to the upper surface of a roof panel, or to the tempered glass of a sunroof or a panorama roof of a vehicle body. This technology is applicable to an environment-friendly vehicle such as a hybrid electric vehicle (HEV), an electric vehicle (EV), or a fuel cell electric vehicle (FCEV) as it tends to use the electric power generated by the solar cell in the vehicle.

For example, when the interior temperature of the vehicle increases during the summer, the electric power generated by a solar cell can be used to operate a fan, thereby lowering the interior temperature of the vehicle, reducing the amount of use of an air conditioner, and improving the fuel efficiency of the vehicle. As such, the solar cell can be used as an eco-friendly energy source in the vehicle.

On the other hand, technology for controlling the sunroof while constantly maintaining an electrical connection between the vehicle body and the roof panel has been also developed.

There have been many attempts to utilize the energy accumulated by the solar cell panel mounted to the sunroof of the vehicle to propel the vehicle through electric wires or electrodes which enable constant electrical connection between the sunroof or the panorama roof and the vehicle body, and further to improve the efficiency of use of the accumulated energy by maintaining the electrical connection while a moving part of the sunroof is still moving.

A conventional technology associated with a roof panel having a solar cell panel is disclosed in Korean Patent Registration No. 10-1428215 (Aug. 1, 2014).

However, in a case where a solar cell is mounted to a sunroof or a panorama roof of the vehicle body, as passenger opens or closes the sunroof of a panorama roof of the vehicle, the solar cell bonded to the roof glass also moves. This movement of the moving part may cause an electrical disconnection and eventually make it difficult to hold energy during movement.

SUMMARY

It is an aspect of the present disclosure to provide a wiring system of a sunroof for a vehicle, which is capable of constantly maintaining an electrical connection between a vehicle body and a moving part of a sunroof when the moving part is moving.

It is another aspect of the present disclosure to provide a wiring system of a sunroof for a vehicle, which includes an electrode part that is positioned at a guide rail of a sunroof and is configured to be extended in the longitudinal direction of the guide rail, whereby the electrode part is capable of moving along with the moving part while the moving part is moving.

In one aspect, the present disclosure provides a wiring system of a sunroof for a vehicle including a moving part configured to move to open or close a roof of a vehicle, and a fixed part configured to connect the moving part and a vehicle body, the fixed part including a guide rail configured to guide movement of the moving part, a moving thread configured to move along the guide rail in a forward or rearward direction of the vehicle, a lever configured to connect the moving part and the moving thread, and an electrode part configured to electrically connect the moving part and the vehicle body, the electrode part constantly maintaining electrical connection between the vehicle body and the moving part when the moving part is moving, and being changed in length depending on movement of the moving thread.

In one form of the present disclosure, the moving part may be a panorama roof to which a solar cell module is connected.

In another form of the present disclosure, the electrode part may include an electrically conductive insert plate, positioned in the lever in order to electrically connect the moving part and the moving thread, and an electric wire, provided on the guide rail and configured to move in a longitudinal direction of the guide rail.

The electric wire may be formed in a coil shape and capable of being shortened or lengthened along the guide rail.

The coil-shaped electric wire may be wound around a rod, which is positioned on the guide rail.

The lever may be configured to perform a tilting operation when the moving part is raised for movement.

The guide rail may include a guide tube having an electric insulation material, and the electric wire may be inserted into the guide tube.

The moving part may include at least one protrusion, and the moving thread may include at least one protrusion formed at a position which the moving thread and the electrode part are in contact with each other.

The electric wire may be formed of an electrically conductive material, which is attached to, coated on or embedded in the guide rail.

The electrode part may be formed of an electrically conductive material, which includes one or more materials selected from the group consisting of a metal, an electrically conductive polymer, a carbon-based electrically conductive material and an oxide-based compound. The metal may include iron (Fe), gold (Au), silver (Ag), aluminum (Al), copper (Cu), tin (Sn) or platinum (Pt). The electrically conductive polymer may include polyaniline, polypyrrole, polythiophene, polyacetylene or poly(3,4-ethylenedioxythiophene) polystyrene sulfonate (PEDOT-PSS). The carbon-based electrically conductive material may include carbon nanotubes (CNT), graphene or carbon black. The oxide-based compound may include ITO, FTO, ZnO or AZO. The electrode part may be manufactured with the selected one or more materials in a form of a tape, film, wire or paste and may be attached to, coated on, or embedded in the fixed part.

Other aspects of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
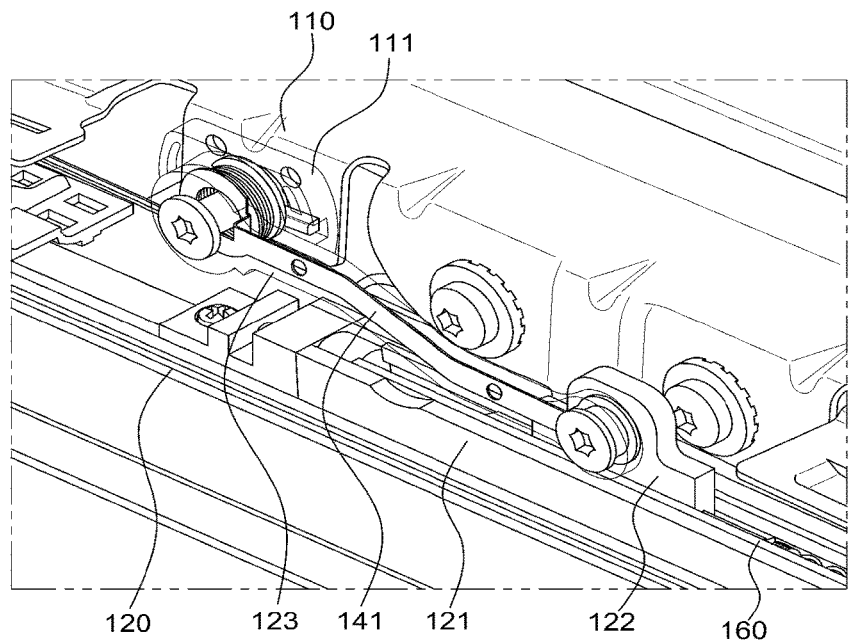
FIG. 1 is a view showing the coupling construction of a wiring system of a sunroof for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terms "part", "unit" and "module" described in the specification mean units for processing at least one function or operation, which can be implemented by hardware components or software components or combinations thereof.

FIG. 1 is a view showing the coupling construction of a fixed part 120 and a moving part 110 of a sunroof 100 in a wiring system of a sunroof for a vehicle according to one form of the present disclosure.

The form of the present disclosure may be configured such that the sunroof 100 equipped with a solar cell panel includes the fixed part 120 and the moving part 110 and such that the solar cell panel is mounted to at least one of the fixed part 120 and the moving part 110 of the sunroof 100.

The wiring system of a sunroof for a vehicle of the present disclosure may be further applied to another exemplary sunroof 100, which is equipped with a heating wire, so as to achieve electrical connection between a battery in the vehicle body and the sunroof 100 including the heating wire.

In addition, the wiring system of a sunroof for a vehicle of the present disclosure may be applied to a further exemplary sunroof 100, to which a smart glass is applied, so as to achieve electrical connection between a battery in the vehicle body and the sunroof 100 including the smart glass.

That is, irrespective of the configuration of the sunroof 100, it is possible to apply the present disclosure to all kinds of vehicles that need electrical connection between the vehicle body and the sunroof 100.

According to one form of the present disclosure including the sunroof 100 having the above-described construction, the moving part 110 is pivotably hinged to the fixed part 120 by a lever 123. The lever 123 is connected to the moving part 110 and performs a tilting operation so as to be raised to a predetermined angle, thereby lifting the moving part 110 up so that the moving part 110 can move.

The moving part 110 is configured such that the movement thereof in the anterior-posterior directions of the vehicle is guided by a guide rail 121 of the fixed part 120. In addition, the moving part 110 is configured to move above the fixed part 120. The guide rail 121 is fixed to a roof frame, which is disposed at each of left and right side ends of the vehicle body. Specifically, the guide rail 121 is disposed at each of left and right side ends of the fixed part 120 and extends in the anterior-posterior directions of the vehicle body. This guide rail 121 functions to guide the lever 123 when the moving part 110 moves. More specifically, the guide rail 121 guides the movement of the moving part 110 in accordance with the movement of a moving thread 122 connected to the lever 123.

In order to move the moving part 110 above the fixed part 120, the lever 123 tilts the moving part 110 without interference between the moving part 110 and the fixed part 120.

If external moisture or water flows into the guide rail 121 while the moving part 110 is open, an electric shock may occur. To inhibit this, electric wires, which are made of an electrically conductive material, may be covered with a rail cover (not shown) having an electrically non-conductive material, such as wood, plastic, cement, SiO2-based material, synthetic fiber, lignified fiber, rubber, urethane or the like.

The fixed part 120 includes the moving thread 122, which is configured to move along the guide rail 121 in the anterior-posterior directions of the vehicle. The moving part 110 is configured to be connected to the moving thread 122 via the lever 123. When the moving thread 122 moves along the guide rail 121, the moving thread 122 guides the movement of the moving part 110.

The present disclosure further includes an electrode part 140 for achieving electrical connection between the moving part 110, the fixed part 120 and the vehicle body (the battery and other electric components provided in the vehicle body). The electrode part 140 includes an insert plate 141 and an electric wire 142. The insert plate 141 is inserted into the lever 123 and electrically connects the fixed part 120 and the moving part 110. The electric wire 142 is inserted into the moving thread 122 and is configured to move along the guide rail 121 of the fixed part 120 in the longitudinal direction of the vehicle.

That is, the electrical connection between the moving part 110, the fixed part 120 and the vehicle body is constantly maintained irrespective of the movement of the moving part 110. The electrode part 140, which is connected to the vehicle body, may be electrically connected to the battery (not shown) disposed in the vehicle body.

The electric wire 142 may be provided on the guide rail 121 in an electrically insulated manner. Specifically, the electric wire 142 may be configured to be inserted into an electrically insulative guide tube 160, which is disposed in the longitudinal direction of the guide rail 121. The electric wire 142 is electrically connected to the insert plate 141 in the inner space of the moving thread 122.

More specifically, the electrode part 140 may be embodied as an electrically conductive material, which is attached to, coated on or embedded in the guide rail 121. The electrode part may be formed of an electrically conductive material, which includes one or more materials selected from the group consisting of a metal, an electrically conductive polymer, a carbon-based electrically conductive material and an oxide-based compound. The metal may include iron (Fe), gold (Au), silver (Ag), aluminum (Al), copper (Cu), tin (Sn) or platinum (Pt). The electrically conductive polymer may include polyaniline, polypyrrole, polythiophene, polyacetylene or poly(3,4-ethylenedioxythiophene) polystyrene sulfonate (PEDOT-PSS). The carbon-based electrically conductive material may include carbon nanotubes (CNT), graphene or carbon black. The oxide-based compound may include ITO, FTO, ZnO or AZO. The electrode part may be manufactured with the selected one or more materials in a form of a tape, film, wire or paste and may be attached to, coated on, or embedded in the fixed part.

Figure 2:
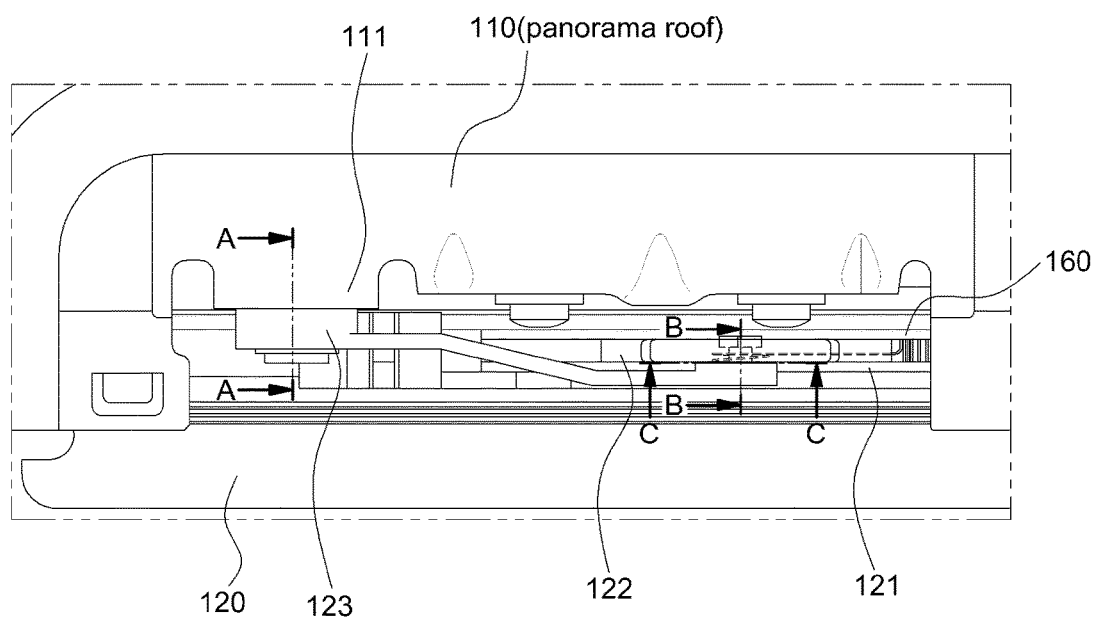
FIG. 2 is a front sectional view of the wiring system of a sunroof for a vehicle.

FIG. 2 is a front sectional view of the wiring system of the sunroof 100 for a vehicle according to one form of the present disclosure.

The moving part 110 and the fixed part 120 are connected to each other via the lever 123, and a coupling part 111 is provided at the position at which the moving part 110 and the lever 123 meet.

The coupling part 111 is configured to be electrically connected to the insert plate 141. In order to reinforce the connection with the insert plate 141, a plurality of protrusions is formed at the position at which the insert plate 141 and the coupling part 111 meet.

Figure 3:
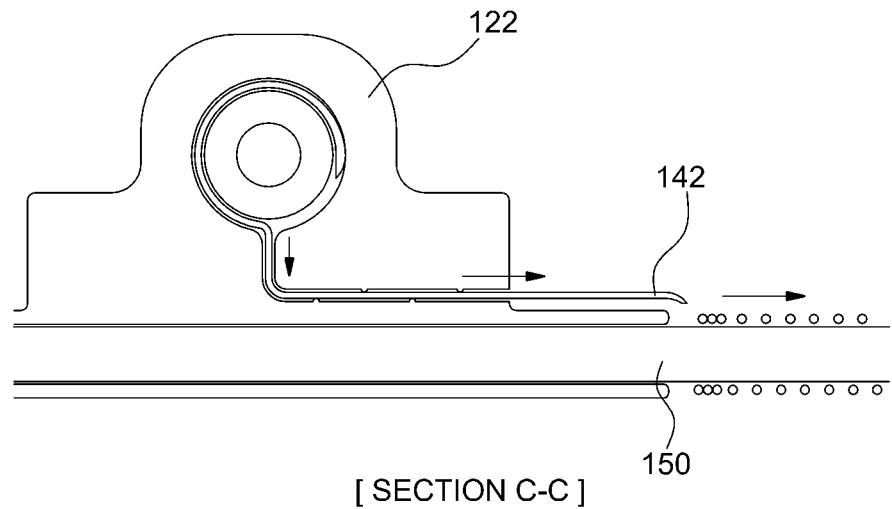
FIG. 3 is a side sectional view of the wiring system of a sunroof for a vehicle.

FIG. 3 is a side sectional view of the moving thread 122 taken along line C-C in the wiring system of the sunroof 100 for a vehicle according to one form of the present disclosure.

As shown in the drawing, the moving thread 122 is positioned on the guide rail 121 of the fixed part 120, and the electrode part 140 is inserted into the moving thread 122. The electrode part 140, which is positioned on the guide rail 121, is configured to be shortened or lengthened along the guide rail 121. Specifically, the electrode part 140 may be formed in the shape of a spring having elasticity.

The electric wire 142 of the electrode part 140, which is positioned in the moving thread 122, is positioned along the guide rail 121 and is inserted into the moving thread 122.

The electric wire 142, which is inserted into the moving thread 122, is electrically connected to the insert plate 141. The moving part 110 and the fixed part 120 of the sunroof 100 are electrically connected to each other via the moving thread 122.

Figure 4:
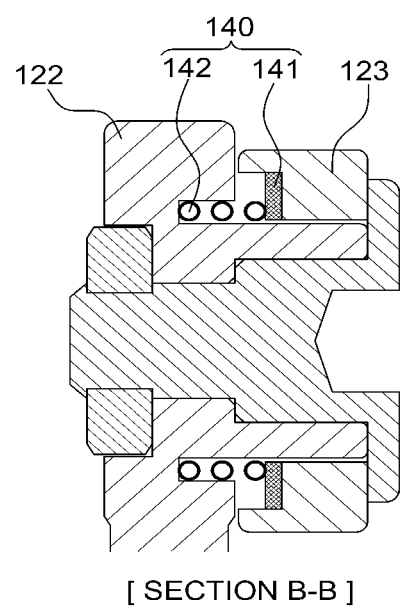
FIG. 4 is a sectional view of a moving thread in the wiring system of a sunroof for a vehicle.

FIG. 4 is a front sectional view of the moving thread 122 taken along line B-B in the wiring system of the sunroof 100 for a vehicle according to one form of the present disclosure.

As shown in the drawing, the moving thread 122 is connected to the lever 123, and is configured to connect the electric wire 142, which is formed in the shape of a spring, and the insert plate 141, which is inserted into the lever 123.

The present disclosure may further include a pin for fixing the moving thread 122 and the lever 123 to each other. The moving thread 122 and the lever 123 may be fixed to each other by the pin or by some other fixing means that is widely used by those skilled in the art.

Figure 5:
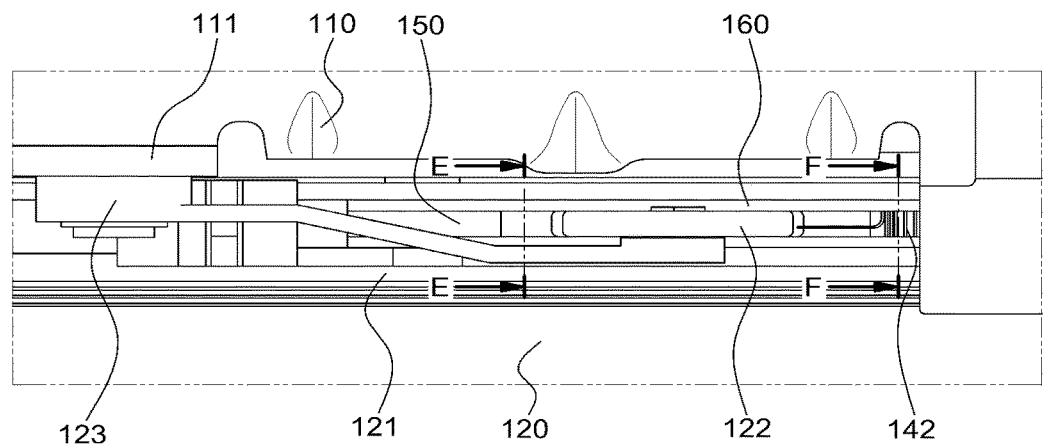
FIG. 5 is a front sectional view of the wiring system of a sunroof for a vehicle.
Figure 6:
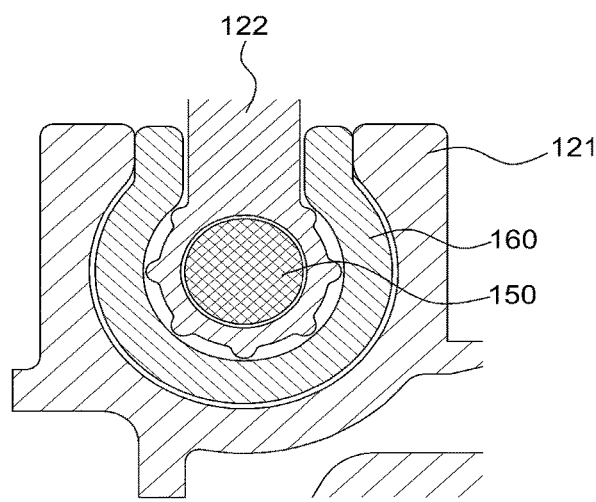
FIG. 6 is a front sectional view of the moving thread in the wiring system of a sunroof for a vehicle.
Figure 7:
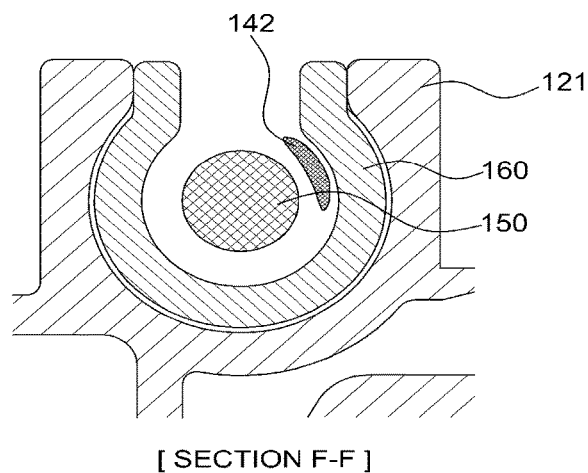
FIG. 7 is a sectional view of a guide rail in the wiring system of a sunroof for a vehicle.

FIG. 5 is a front sectional view of the wiring system of the sunroof 100 for a vehicle according to one form of the present disclosure, and FIGS. 6 and 7 are sectional views of the guide rail 121 taken along line E-E and line F-F, respectively.

As shown in FIG. 6, the guide rail 121, which is disposed in the fixed part 120 and extends in the longitudinal direction of the vehicle, includes the moving thread 122. The electric wire 142, which is formed in the shape of a coil spring and is disposed along the guide rail 121, is wound around a rod 150. The rod 150 is configured to be inserted into the spring-shaped electric wire 142 and also to be inserted into a through-hole formed in the lower portion of the moving thread 122. When the moving thread 122 moves along the guide rail 121, the rod 150 functions to guide the movement of the moving thread 122.

The electric wire 142 and the moving thread 122 are inserted in the electrically insulative guide tube 160, which is disposed on the guide rail 121. Therefore, electrical insulation between the guide rail 121 and the electrode part 140 is maintained by the electrically insulative guide tube 160.

In addition, as shown in FIG. 7, the rod 150 is also included in the electrically insulative guide tube 160, which is disposed on the guide rail 121. Therefore, the electric wire 142, which is wound around the rod 150, is disposed in the longitudinal direction of the guide rail 121.

The electric wire 142 has elasticity so as to be capable of being shortened or lengthened in the longitudinal direction of the vehicle. The change in shape of the electric wire 142 corresponds to the movement of the moving part 110. That is, when the moving part 110 is opened, the lever 123 tilts the moving part 110 and the moving part 110 moves in the rearward direction of the vehicle. At this time, the electric wire 142, which is connected to the moving thread 122, is shortened in the longitudinal direction of the vehicle.

Conversely, when the moving part 110 is closed, the moving thread 122 moves in the forward direction of the vehicle, the moving part 110, which is connected to the moving thread 122 via the lever 123, also moves in the same direction, and the electric wire 142 connected to the moving thread 122 is lengthened.

Further, the rod 150 is disposed along the guide rail 121, and the electric wire 142 is wound around the rod 150 positioned on the guide rail 121. Therefore, when the moving thread 122 moves along the guide rail 121 in the forward or rearward direction of the vehicle, the electric wire 142 wound around the rod 150 is shortened or lengthened.

Figure 8:
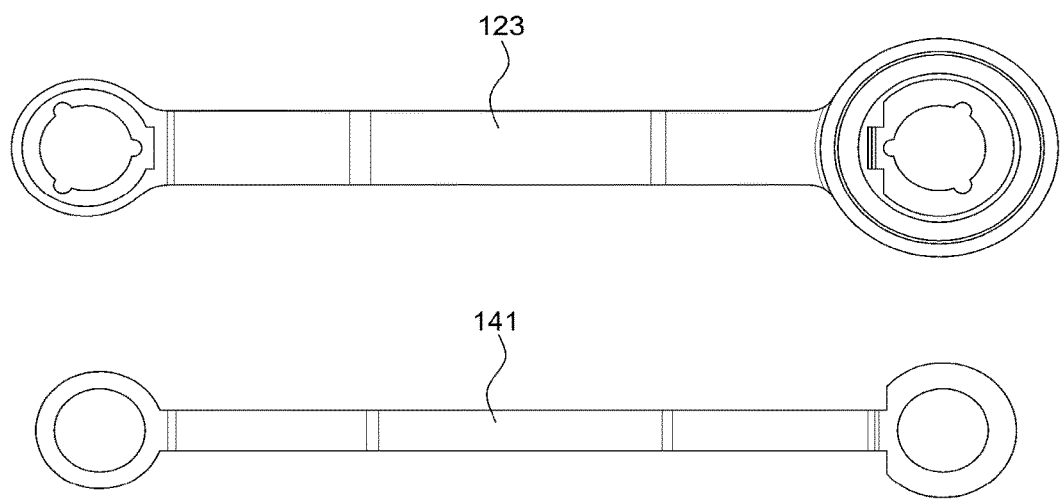
FIG. 8 is a view showing the construction of a lever in the wiring system of a sunroof for a vehicle.

FIG. 8 is a view showing the construction of the lever 123 for electrically connecting the moving part 110 and the fixed part 120 in the wiring system of the sunroof 100 for a vehicle according to one form of the present disclosure.

The lever 123, which electrically and physically connects the moving part 110 and the fixed part 120 so as to lift the moving part 110 up, includes the insert plate 141, which is formed of an electrically conductive metal. The insert plate 141 is constructed such that it is electrically connected to the electric wire 142 of the fixed part 120.

Specifically, due to the construction in which the electric wire 142 positioned in the moving thread 122 and the insert plate 141 are electrically connected to each other, the electrical connection between the fixed part 120, the moving part 110 and the vehicle body is constantly maintained irrespective of the movement of the lever 123.

More specifically, due to the construction in which the insert plate 141 is disposed in the lever 123, which is configured to pivot when the moving thread 122 moves along the guide rail 121, even when the moving part 110 moves, the electrical connection between the insert plate 141 and the electric wire 142 disposed in the moving thread 122 is constantly maintained.

That is, even when the moving part 110 of the sunroof 100 moves, electric current can flow between the insert plate 141 disposed in the lever 123 and the electric wire 142 disposed in the moving thread 122. Consequently, the electrical connection between the moving part 110, the fixed part 120 and the vehicle body is constantly maintained irrespective of the movement of the moving part 110.

Figure 9:
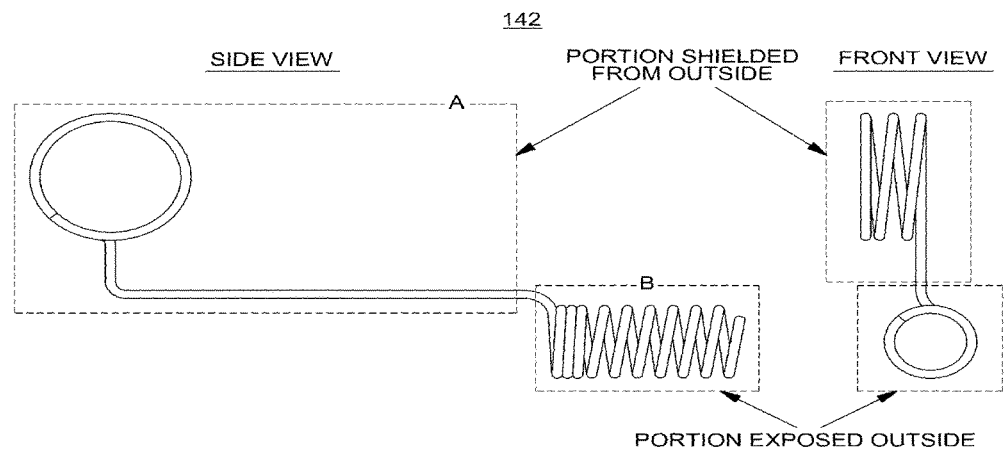
FIG. 9 is a view showing an electric wire in the wiring system of a sunroof for a vehicle.
Figure 10:
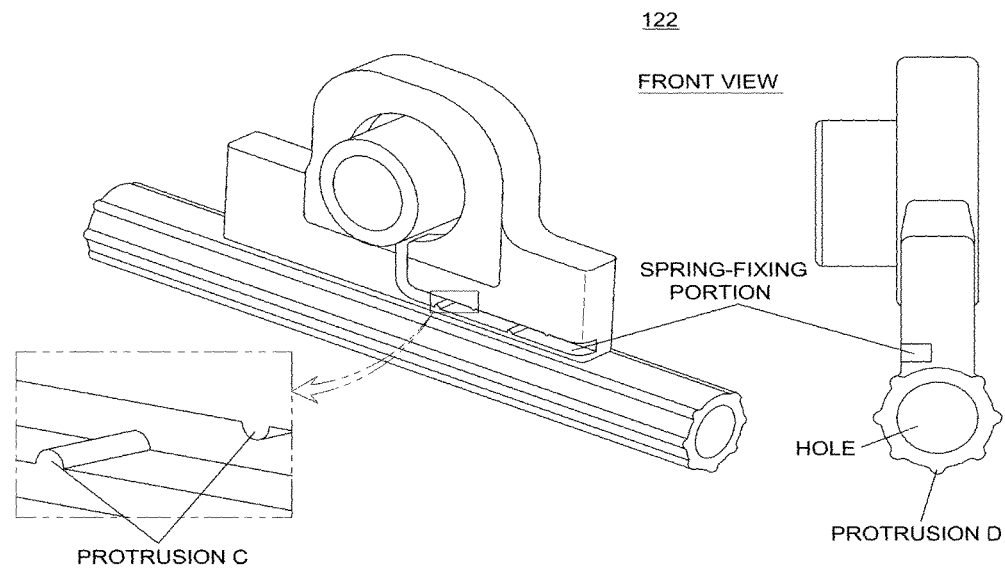
FIG. 10 is a view showing the construction of the moving thread in the wiring system of a sunroof for a vehicle.

FIG. 9 is a view showing the construction of the electric wire 142, which is disposed along the guide rail 121 and is inserted into the moving thread 122, in the wiring system of the sunroof 100 for a vehicle according to one form of the present disclosure, and FIG. 10 is a view showing the construction of the moving thread 122 in the wiring system of the sunroof 100 for a vehicle according to one form of the present disclosure.

As shown in FIG. 9, the electric wire 142 may be configured as an electrically conductive material or metal, which is attached to, coated on or embedded in the guide rail 121. Specifically, the electric wire 142, which is positioned on the guide rail 121, may be wound around the rod 150, and may also be inserted into the guide tube 160 so as to be electrically insulated from the guide rail 121.

As shown in FIG. 10, the electric wire 142 is fixedly disposed in the moving thread 122. Specifically, the electric wire 142 is wound along the inner wall of the moving thread 122. More specifically, the electric wire 142, which is wound along the inner wall of the moving thread 122, is electrically connected to the insert plate 141, thereby electrically connecting the moving part 110 and the fixed part 120.

In order to securely support the electric wire 142 wound along the inner wall of the moving thread 122, a plurality of protrusions is formed at a portion at which the moving thread 122 and the electric wire 142 are in contact with each other.

In addition, the moving thread 122 may have a through-hole, into which the rod 150 positioned on the guide rail 121 is inserted. Further, the moving thread 122 may have a plurality of protrusions, which extend in the longitudinal direction corresponding to the guide rail 121, so as to reduce the frictional force and load generated when the moving thread 122 moves along the guide rail 121.

Accordingly, the guide rail 121 may have a plurality of grooves formed in the inner wall thereof so as to be engaged with the longitudinal protrusions of the moving thread 122, thereby making smooth movement of the moving thread 122.

The present disclosure facilitates a constant electrical connection between the vehicle body, the moving part and the fixed part when the moving part is still moving.

Further, due to the electrode part, which is constantly electrically connected to the fixed part and the moving part including the solar cell panel, it is possible to use the energy accumulated by the solar cell panel for the vehicle while the moving part is moving, thereby improving energy efficiency.

In addition, since the solar cell panel is also mounted to the moving part as well as the fixed part of the sunroof of the vehicle, the area to which the solar cell panel can be mounted is expanded, thereby enhancing the utilization of the solar cell for the vehicle and the solar energy for the various purposes in the vehicle. As a result, the fuel efficiency of the vehicle may be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A wiring system of a sunroof for a vehicle comprising:
    a moving part configured to move to open or close a roof of the vehicle; and
    a fixed part configured to connect the moving part and a vehicle body,
    wherein the fixed part comprises:
        a guide rail configured to guide movement of the moving part;
        a moving thread configured to move along the guide rail in a forward or rearward direction of the vehicle;
    a lever configured to connect the moving part and the moving thread; and
    an electrode part configured to electrically connect the moving part and the vehicle body,
        wherein the electrode part constantly maintains electrical connection between the vehicle body and the moving part when the moving part is moving, and is changed in length corresponding to movement of the moving thread.

2. The wiring system of claim 1, wherein the moving part is a panorama roof to which a solar cell module is connected.

3. The wiring system of claim 1, wherein the electrode part comprises:
    an electrically conductive insert plate, positioned in the lever configured to electrically connect the moving part and the moving thread; and
    an electric wire configured to move in a longitudinal direction of the guide rail.

4. The wiring system of claim 3, wherein the electric wire is formed in a coil shape and capable of being shortened or lengthened when moving along the guide rail.

5. The wiring system of claim 4, wherein the coil-shaped electric wire is wound around a rod, the rod being positioned on the guide rail.

6. The wiring system of claim 1, wherein the lever is configured to perform a tilting operation when the moving part is raised for movement.

7. The wiring system of claim 3, wherein the guide rail comprises:
    a guide tube having an electric insulation material; and
    the electric wire being inserted into the guide tube.

8. The wiring system of claim 1, wherein the moving part comprises at least one protrusion, and the moving thread comprises at least one protrusion formed at a position which the moving thread and the electrode part are in contact with each other.

* * * * *